Dec. 12, 1961  W. W. MULTANEN  3,012,358
FISH LURE
Filed June 17, 1958

WILLIAM W. MULTANEN
INVENTOR
HUEBNER & WORREL
ATTORNEYS
BY Richard M. Worrel

3,012,358
FISH LURE
William W. Multanen, 3060 Mission Drive,
Santa Cruz, Calif.
Filed June 17, 1958, Ser. No. 742,665
2 Claims. (Cl. 43—42.28)

The present invention relates to a fish lure and more particularly to a lure adapted generally to simulate the appearance of live bait having dangling legs, a wiggling body or tail, or other movable appendages adapted to conceal a fishhook, and which is simple and economical to construct and assemble.

There are many varieties of lures all having as their general purpose the deception and attraction of fish. Most lures are constructed to simulate the appearance of a natural fly, bug, worm, or insect and usually include a body portion mounted on a fishhook having a tail portion extended rearwardly in concealing relation to the point of the fishhook. It has been known to utilize feathers, rubber bands, and various streamers for such a tail portion. The rubber bands, in addition to camouflaging the fishhook, wiggle around in the water and resemble worm or leg movement.

Specifically, it has been known to provide an elongated rectangular blank of rubber material with slits in its opposite end portions, thereafter to fold the blank in the middle, to extend the hook through the center of the folded blank so that the slits in the blank form streamers which extend around and generally conceal the hook. Another type of lure of this general nature includes a length of gut which is folded upon itself and tied onto a fishhook so that the free ends of the gut extend around and trail behind the fishhook. Although perhaps satisfactory in ultimate result, the known prior art lures employing trailing rubber streamers and typified by the examples described, have been relatively difficult and time consuming to construct and assemble. In addition, and perhaps because of the manner of construction thereof, these lures have not been as realistic as desirable.

Accordingly, it is an object of the present invention to provide a fish lure adapted to simulate active live bait.

Another object is to provide a lure which is simple and economical to construct and assemble.

Another object is to attach a rubber band to a body of a fish lure and to a fishhook in a simple and dependable manner and so that it forms tail portions extended around and trailing behind the fishhook.

Another object is to provide a fish lure which conceals the point and bent portion of a fishhook in an improved manner.

Another object is to provide such a fish lure of the spinning type.

These, together with other objects, will become more fully apparent upon reference to the following description.

Figure 1:
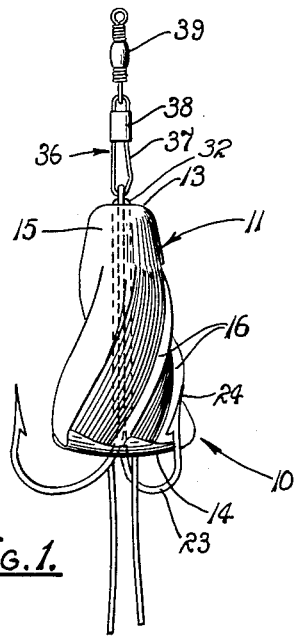
FIG. 1 is a side view of a fish lure arranged in upright position and embodying the principles of the present invention.

Referring more particularly to the drawing, the fish lure of the subject invention is generally indicated by the numeral 10 in FIG. 1. The lure provides an elongated body 11 having an axial bore or other opening 12 extended therethrough, a front end 13, a rear end 14, and a frusto-conical side surface 15 in concentric circumscribing relation to the bore. The side surface of the body has a plurality of elongated flutes 16 longitudinally spirally extended from the front end to the rear end of the body, as best seen in FIG. 1, substantially coextensive with said frusto-conical side surface.

Also included in the lure 10 is a fishhook 20 having an elongated shank 21, an eyelet 22 smaller in diameter than the bore 12 and integrally secured to a forward end of the shank, and a plurality of bent portions 23 integrally secured to a rearward end of the shank and reversely turned forwardly and terminating in sharpened points 24. The hook is thus a three-pronged type wherein the bent portions are substantially equally angularly related to each other. It will be evident as the description proceeds that the hook could as well be single, double, or any other plural arrangement desired.

Figure 3:
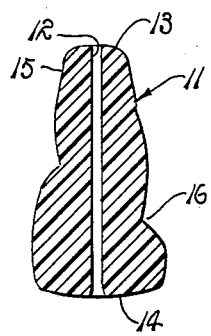
FIG. 3 is a longitudinal section taken through the body only of the lure.
Figure 2:
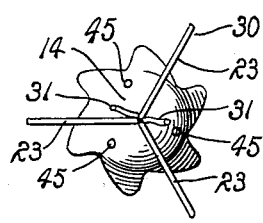
FIG. 2 is a rear end view of the lure of FIG. 1.
Figure 4:
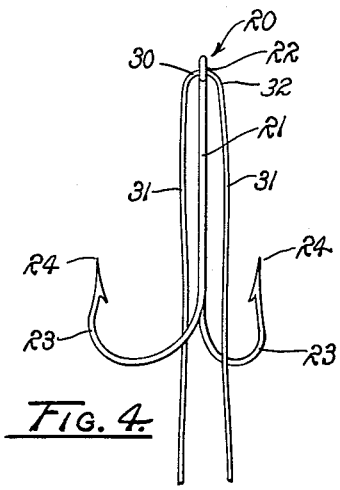
FIG. 4 is a view of a fishhook and rubber band attached thereto in accordance with the principles of the present invention.

An elongated flexible strand 30, preferably of rubber or plastic, provides opposite end portions 31 and is threaded through the eyelet 22 of the hook 20 and folded upon itself to provide a forward folded portion 32 in the eyelet and so that the opposite end portions are of substantially equal lengths. As such, the end portions extend longitudinally rearwardly along the shank 21 of the hook and rearwardly of the bent portions 23. As illustrated in FIGS. 3 and 4, the combined thickness of the end portions of the strand and the shank is greater than the diameter of the bore 12. Also, the end portions are longer than the fishhook, all as best seen in FIG. 4. The strand 30 employed may be conveniently formed simply by transversely cutting a conventional endless rubber band to form the single elongated strand shown.

With the strand 30 associated with the hook 20, as described above and illustrated in FIG. 4, the shank 21 is longitudinally slidably extended through the bore 12 of the body 11 from the rear end 14 toward the front end 13 carrying the strand therewith. Inasmuch as the shank 21 is substantially equal in length to the length of the body 11, the eyelet 22 extends outwardly from the front end 13 of the body and the bent portions 23 extend outwardly from the rear end 14 of the body when the shank is properly positioned in the bore. Further, in this position, the end portions 31 of the strand extend rearwardly outwardly from the body 11 around the bent portions of the hook and further extend in trailing relation to the bent portions of the hook, as seen in FIG. 1. Although only one strand is illustrated, it is to be understood that several may be provided and extended through the eyelet of the hook downwardly through the bore, and outwardly at the rear end of the body, if desired.

For attaching the lure 10 to a fish line, not shown, a fastener 36 is provided having a safety-type pin 37 coupled to the eyelet 22 of the hook 20 in its extended position from the body 11. A clasp 38 releasably holds the pin in closed position, as shown in FIG. 1. A swivel 39 of well-known form is connected to the fastener at the opposite end thereof from the eyelet and the latter is provided with an eyelet for connection to a fish line. In this manner, the body is mounted for rotatable movement around its axis on such a fish line.

Figure 5:
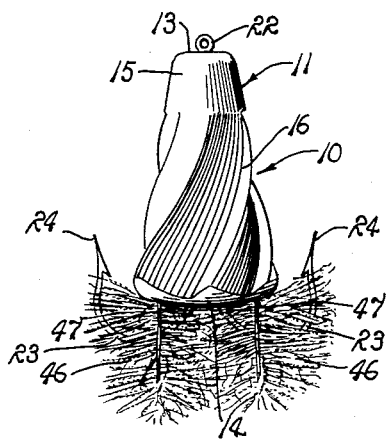
FIG. 5 is a view similar to FIG. 1 but showing how feathers are incorporated in the subject lure.

The body 11 also has a plurality of sockets 45 extended inwardly from the rear end 14 and in spaced relation therearound. As seen in FIG. 5, a plurality of feathers 46 provide quills 47 fitted, and preferably glued or otherwise secured, in the sockets and mounting the feathers so as to extend rearwardly from the body around the bent portions 23 of the hook 20 in concealing relation thereto. It is to be observed that the angle and direction of extension of the feathers from the body can be varied as desired to shield or conceal more or less of the bent portions and points 24 of the hook. Insofar as camouflaging the points and bent portions of the hook is concerned, it should be noted if more strands 30 are employed to provide additional trailing end portions 31, that the strands would also have additional concealing effect especially because of their movements when drawn through the water.

*Operation*

The operation of the described embodiment of the present invention is believed to be readily apparent and is briefly summarized at this point.

After the fish lure 10 is assembled in the manner described above, the swivel 39 is attached to a fish line, not shown, and the lure cast into the water. As the lure is pulled along through the water by the fish line, it rotates relative to the line around its axis defined by the bore 12. It is found in practice that the lure spins so fast that an audible sound is produced because of the provision of the flutes 16 in the side surface 15 of the body 11.

As the body 11 rotates and moves rapidly through the water, the end portions 31 of the strand 30 trail along behind and wiggle around in simulation of the legs, tail, or other body part of an insect or worm, and in particular an angleworm. This movement of the end portions of the strand also has a camouflaging effect on the bent positions 23 and points 24 of the hook 20 since the end portions are moving around the bent portions and points and at times it is difficult to distinguish between the hook and the strands. Further, when the feathers 46 are employed, these also have a concealing effect on the hook.

After a fish has bitten on the hook 20 or has snapped at the lure 10, it may be desirable to replace the strand 30. This is easily done by releasing the fastener 36 from the eyelet 22, and sliding the shank 21 and what remains of the strand downwardly through the bore 12 and outwardly thereof. A new strand is attached to the hook, and the lure is reassembled in a manner believed evident. Obviously, the fasteners 46 can be easily replaced if required.

Although reference has been made to the utilization of a rubber band as the tail or leg simulating member, it is to be understood that other materials such as gut, leather, and the like, and even food objects could be used as well.

From the foregoing it will be evident that a fish lure having several desirable characteristics has been provided. Of primary significance is the fact that the lure is easy to assemble and disassemble and is economical to construct. The lure provides portions which closely resemble a wiggling worm and effectively conceal the points of the fishhook. Furthermore, as the lure is drawn through the water, it rotates and produces an audible sound which also tends to attract fish thereto.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a fishing lure adapted to simulate live bait comprising an elongated body providing opposite front and rear ends, and an elongated, substantially straight central bore extended therethrough and open at the opposite ends of the body, the body also having an outer side surface circumscribing the body and being provided with a plurality of elongated grooves longitudinally spirally extended from the front end thereof to the rear end to impart rotation to the body as it is pulled through water; a fishhook including an elongated substantially straight shank of smaller diameter than the bore in the body and being releasably extended through said bore, the shank having forward and rearward ends respectively adjacent to the front and rear ends of the body, the fishhook further including an eyelet of smaller diameter than said bore connected to the forward end of the shank and being forwardly extended from the body, and a reversely bent integral portion rearwardly extended from the rearward end of the shank and thence forwardly in opposed, relatively closely, laterally spaced relation to the outside surface of the body, said reversely bent portion terminating in a point; and an elongated flexible strand of resiliently compressible material freely releasably threaded through the eyelet and doubled upon itself thereby providing a pair of opposite end portions interconnected by a forward folded portion in the eyelet, said end portions being extended rearwardly through the bore alongside of but disconnected from the shank and thence rearwardly outwardly from the body adjacent to the reversely bent portion of the hook thereby to simulate bait, the end portions of the strand within the bore being under compression between the shank and the body thereby yieldably to resist longitudinal and rotational movement of the body relative to the shank while permitting removal of the fishhook and the strand from the body upon application of sufficient axial force applied to the fishhook rearwardly relative to the body, said reversely bent portion of the hook engaging the rear end of the body adjacent to the juncture of the shank and said reversely bent portion and limiting rearward movement of the body on the shank to an assembled position wherein only the eyelet of the hook projects forwardly from the front end of the body and wherein the strand is only partially exposed at the front end of the body and is extended rearwardly beyond the reversely bent portion of the shank to permit radial deflection of the strand upon rotation of the lure.

2. The lure of claim 1 wherein the strand is a rubber thread-like member which has opposite end portions; and wherein the combined thickness of said end portions and the shank is greater than the diameter of the bore.

References Cited in the file of this patent

UNITED STATES PATENTS

| | | |
|---|---|---|
| 456,931 | Angell | Aug. 4, 1891 |
| 1,508,111 | Meyer | Sept. 9, 1924 |
| 1,725,636 | Heaslip | Aug. 20, 1929 |
| 2,518,487 | Metz | Aug. 15, 1950 |
| 2,563,282 | Schenck | Aug. 7, 1951 |
| 2,594,264 | Riner | Apr. 22, 1952 |
| 2,741,057 | Morris et al. | Apr. 10, 1956 |

OTHER REFERENCES

Popular Mechanics, September 1948, page 172, Rubber Band Lure.